Oct. 8, 1963  J. C. McGREW  3,106,005
CONDUIT FORMING MACHINE WITH DOWEL PIN HOLE FORMER
Filed Nov. 5, 1958  2 Sheets-Sheet 1
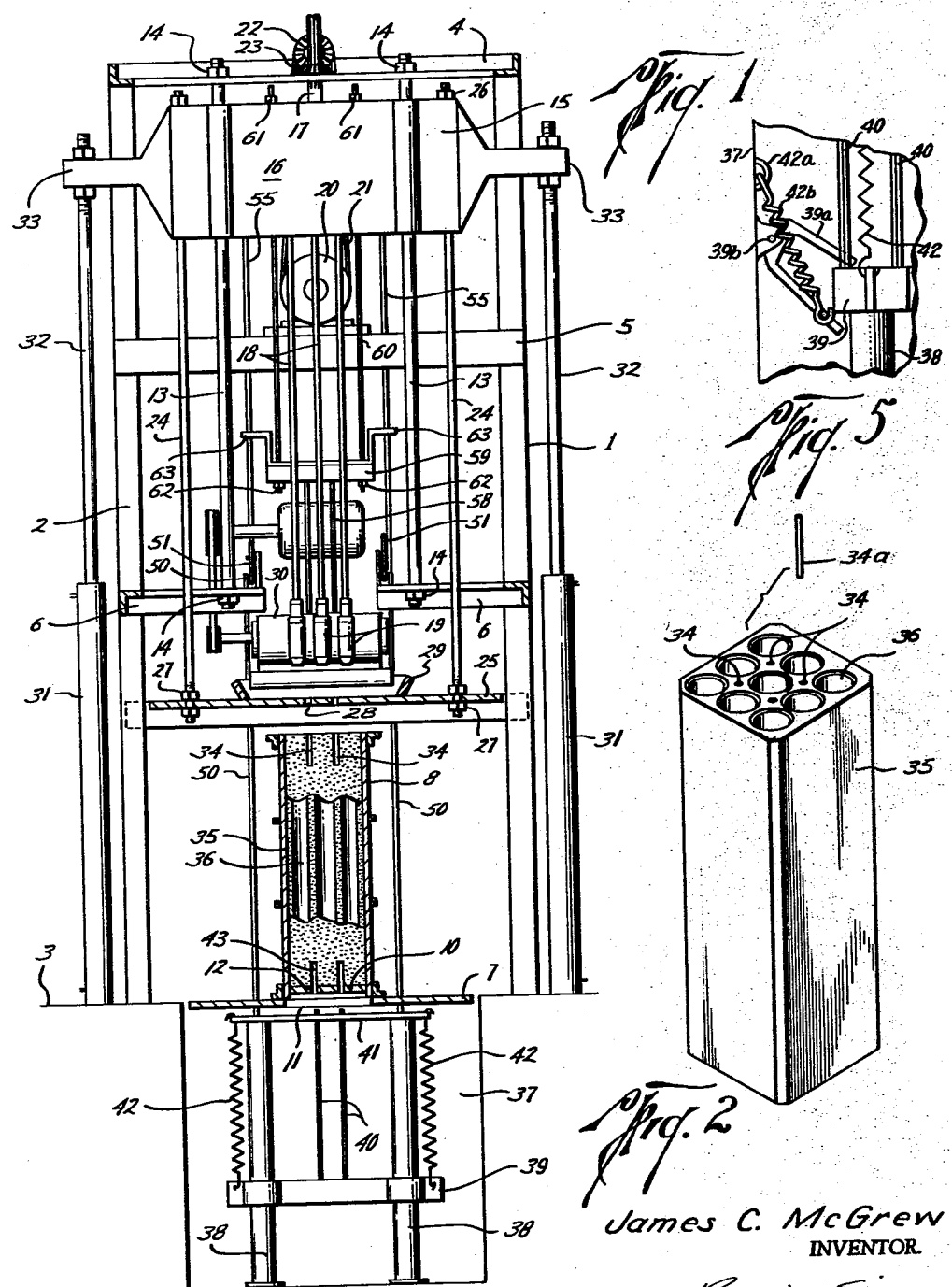
James C. McGrew
INVENTOR.
BY
ATTORNEYS

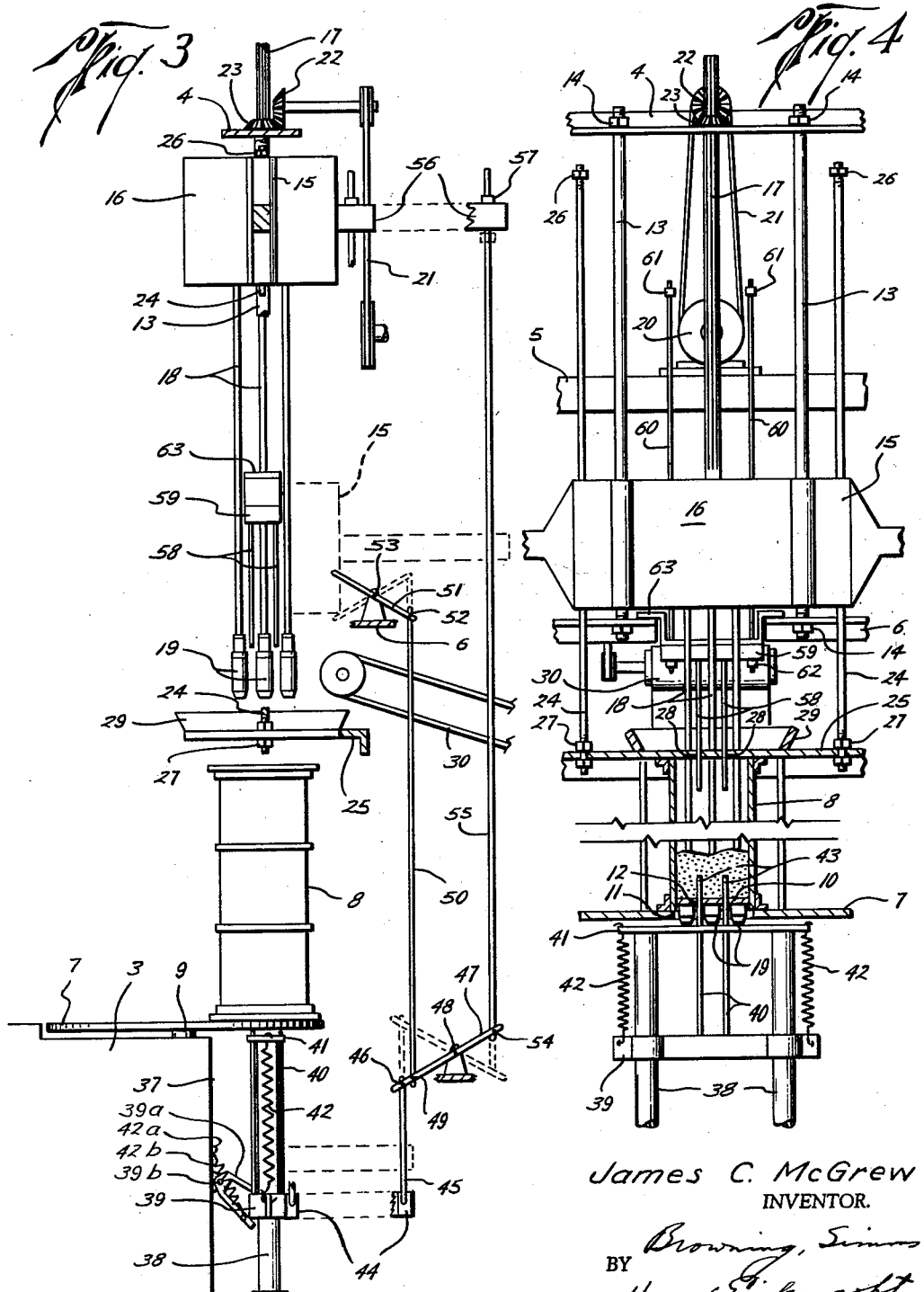

United States Patent Office 3,106,005
Patented Oct. 8, 1963

3,106,005
CONDUIT FORMING MACHINE WITH DOWEL PIN HOLE FORMER
James C. McGrew, Bellaire, Tex., assignor of small interests to various assignees
Filed Nov. 5, 1958, Ser. No. 772,031
2 Claims. (Cl. 25—36)

This invention relates to machines for manufacturing multihole conduits such as the conduit utilized in laying underground communication cable or the like.

The present general practice in laying underground cable for communication lines is to run cables through buried conduit. Multicell or multiduct conduit is utilized. The conduit employed most widely in the past has been a fired clay. This product requires a clay of very particular qualities and is available in limited quantities. Until recently there has not been an adequate alternative to this product. Recently a machine has been provided for manufacturing multihole conduit from concrete or the like which may be utilized in running cable and for other purposes for which conduit may be used. In that machine a plurality of packer heads is employed corresponding in number to the number of ducts to be formed in the multiduct conduit desired, each of these heads being somewhat similar to the single packer head previously used in fabricating single bore concrete conduit. In such a machine the rotating packer heads in effect provide the packing walls for each other; that is, one packer head in rotating packs against an adjacent packer head, and it is not necessary to have a wall of the mold surrounding each packer head. These packer heads are caused to travel endwise through a mold as the mold is filled with cement mix and cause the packing of the mix around the packer heads which in passing through the mold leave the desired ducts through the formed concrete behind them.

To provide means for aligning adjacent sections of conduit small dowel pin holes are formed in each end of each section of conduit. Such holes are useful in single duct conduit but the necessity for them is paramount in multiduct conduit. In previous machines the means for forming these dowel pin holes has involved dowel pin hole forming pins mounted on the end walls of the forms. Then when or after the end walls are removed from the formed conduit the hole forming pins are removed and the holes are left for the reception of dowel pins.

This arrangement usually resulted in the formation of satisfactory dowel holes, especially when the pins were removed after the concrete had set, but the operation of removing the dowel hole forming pins was then quite difficult, requiring painstaking effort, and frequently resulting in damage to the conduit section which required either repair work or discard of the conduit section. The damage to the conduit was even more apt to occur if the removal was before setting.

It is, therefore, an object of this invention to provide a concrete conduit forming machine with dowel hole forming mechanism which will avoid the difficulties experienced with prior arrangements.

Another object is to provide for removal of dowel hole forming means from a concrete conduit before it sets but without damage to the conduit.

Another object of this invention is to provide such a dowel hole forming mechanism which will be automatically retracted and withdrawn from the formed conduit and the form therefor at the end of the forming operation, without opportunity for damage to the formed section and without the requirement of any arduous effort for the removal of such hole forming means.

Other objects and advantages of this invention will become apparent from the following description taken in connection with the accompanying drawings wherein is set forth by way of illustration and example one embodiment of this invention.

In the drawings:

FIG. 1 is a view partly in front elevation and partly in longitudinal cross-section illustrating a machine constructed in accordance with this invention, with the various parts in the position they occupy at the end of a forming operation.

FIG. 2 is a perspective of a multiduct conduit section having dowel pin holes formed in its end after the manner in which such holes are adapted to be formed by the present invention, and illustrating a dowel pin of the type adapted to be used in such holes.

FIG. 3 is a view partly in side elevation and partly in longitudinal cross-section illustrating the same machine as shown in FIG. 1.

FIG. 4 is a fragmentary view partly in front elevation and partly in longitudinal cross-section illustrating the same machine as shown in FIGS. 1 and 3 but with the parts, including the dowel hole forming mechanism, in the positions which they occupy during the forming of the section of conduit.

FIG. 5 is an enlarged fragmentary view illustrating in more detail the detent for the dowel hole forming pins shown in FIG. 3, parts being broken away for clarity.

The objects of this invention are accomplished by the provision of means for forming the dowel pin holes, comprising pins that extend through openings in the end walls of the form instead of being secured to the end walls, and which are adapted to be withdrawn while the end walls are still in place so that there is no tendency to pull away a portion of the formed conduit section in the extraction of the hole forming means. The present invenion also provides a mechanism forming part of a machine in which such multiduct conduit is made which mechanism will cause the entrance of the dowel pin hole forming means into the form to the proper degree when the form is in place and as the packer heads which pack the slurry in the form and form the ducts therethrough are moved into position to begin the forming of a section of conduit. Mechanism is also provided whereby when the conduit section is completely formed a slight additional movement of the packer heads to remove them from the forms causes also the extraction of the dowel pin hole forming mechanism from the forms before the end walls of the forms are removed.

Referring more in detail to the drawings, the invention is illustrated in connection with a multiduct conduit forming machine which is generally carried by a suitable framework consisting of upright members 1 and 2 mounted on a suitable foundation 3 and having suitably located cross members 4 and 5 and a transverse support 6 which in the illustration is shown as interrupted adjacent the central portion thereof so as to permit passage of the duct forming packer heads and their associated equipment, as well as of that portion of the dowel pin hole forming mechanism which forms the dowel pin holes in the upper end of the concrete conduit section.

In the type of machine illustrated a movable form support 7 is provided for supporting the form 8 in upright position for the forming operation. This platform or support is preferably made movable to facilitate the removal of the form after the forming operation is complete and in the present instance is illustrated as being in the form of a turntable mounted on a central pivot 9 as shown in FIG. 3.

The form 8 is provided with a bottom wall 10 removably secured therein. This bottom wall 10 is provided with openings which are of a diameter substantially the diameter of the ducts to be formed in the finished conduit section. The purpose of these openings will presently appear.

The bottom wall 10 of the form is also provided with openings 12 of a size and in positions corresponding to the positions in which it is desired that dowel pin holes be formed in the lower end of the finished conduit. These positions are the same as the positions at which dowel hole pin forming pins were secured in previous machines to the bottom wall of the form and their utility in accordance with the present invention will presently appear. The support table 7 has an opening 11 approximately the size of and registering with the bottom wall of the form.

The frame is provided with a guide in the form of upright bars 13 secured at their opposite ends by nuts or the like 14 to the cross member 4 at their upper ends and to the support members 6 at their lower ends. Slidably mounted on this guide is a slide 15 in which is carried a gear box 16 for converting the drive from a driving shaft 17 into rotation of the various packer head carrying and operating shafts 18 which extend downwardly from the gear box 16. These have on their lower ends packer heads 19 of suitable character the details of which form no part of the present invention but which ordinarily have upper packer portions and lower troweling portions. The driving shaft 17, while being permitted to move upwardly and downwardly, is adapted to be rotated by any suitable means such as a motor 20, a belt drive 21 therefrom to a driving bevel gear 22 which is in turn in mesh with a driven bevel gear 23 having splines therein adapted to receive the splined upper end of the shaft 17.

Suspended from the slide 15 by means of suspension rods 24 is a loading table 25 which is mounted between the side frame members 1 and 2 for upward and downward sliding movement. A lost motion connection is provided between this table 25 and the slide 15 by making the suspension rods 24 slidable within the slide 15 to a degree which is limited by the nuts 26 engaging these rods on top of the slide 15. The lower ends of these rods are secured to the table 25 by means of nuts 27.

It will be seen that as slide 15 starts downwardly the table 25 will move with it until this table rests upon the top of the form 8, whereupon its downward movement will be arrested. However, the slide 15 with its pendant packer heads 19 may continue its downward movement until these packer heads 19 extend not only through the bottom wall 10 of the form 8 but also through the support table 7 as illustrated in FIG. 4.

When at rest upon the top of the form 8 the table 25 serves as the top wall of this form and has appropriate openings to permit the passage therethrough of the packer heads 19, as well as smaller pin openings 28 to permit the passage therethrough of the dowel pin hole forming pins. This table 25 also has an upstanding flange 29 on its upper surface providing a shallow hopper adapted to receive cement slurry or mix from a conveyor mechanism 30, so that such mix may be fed through the openings in the table.

Any suitable means may be provided for raising and lowering the slide 15. The means illustrated is a pair of hydraulic cylinders 31 having pistons therein actuating piston rods 32, the upper ends of which are secured to the laterally extending elements 33 on the slide 15.

Heretofore dowel holes 34 for pins 34a have in the past been formed in conduits 35 having ducts 36 by means of pins secured to the bottom plate 10 and to the top plate or table 25, in each case being withdrawn when or after the top or bottom plate is removed, as the case may be. Since the form was usually set on its lower end during curing of the concrete, the lower end plate and lower pins were not removed until after curing.

Directly beneath that portion of the table which carries the form 8 is provided a pit or other space 37 in which are mounted dowel hole forming means movable upwardly through the holes 12 into the form and downwardly to a position below the table 7. An exemplary structure includes suitable guides such as the upright guide posts 38. On these guide posts 38 is a slide or cross bar 39 carrying pins 40 extending upwardly therefrom and held in alignment with the openings 12 by means of openings in a cross bar 41 on the guide posts 38. The cross head 39 may have its weight partially counterbalanced by suitable springs 42 extending upwardly and engaging the ends of the cross bar 41. The cross head 39 may be moved upwardly until the upper ends of the pins 40 project into the interior of the form 8 through the bottom wall 10. A conduit formed while the pins are thus in place within the form 8 will be formed with dowel pin holes 43 in its lower end.

The cross head 39 is provided with lugs 44 adjacent its opposite ends, to which are secured duplicate operating mechanisms. Each has a rod 45 extending upwardly from the lug 44. The upper end of this rod 45 is pivotally connected at 46 to one end of a lever 47 whose fulcrum is at 48. Adjacent the same end of the lever 47 there is pivoted thereto at 49 a second rod 50 which at its upper end is connected to a second actuating lever 51 at 52. The lever 51 is fulcrumed at 53 and has its end opposite the pivot 52 disposed to be engaged by the lower portion of the slide 15 as this slide nears the lower extremity of its travel. After the slide 15 engages the lever 51, it will swing the lever 51 from the solid line position to the dotted line position shown in FIG. 3. This operation will pull upwardly on the rod 50 and on the rod 45, swinging the lever 47 to its dotted line position and moving the lug 44 upwardly to its dotted line position. This moves the pins 40 upwardly until they project into the form far enough to form the dowel pin holes 43 when a conduit is formed in the form 8.

In order to hold the pins 40 in their upper position during the filling of the form, one or more forked levers 39a are provided, each straddling the cross head 39 and mounted on a fixed pivot 39b. A spring 42a is secured to the lever 39a and extending to an anchor 42b located to extend the spring 42a across or adjacent the axis of the pivot 39b when the lever 39a and cross head 39 are in their lower positions. Thus the springs 42a will have little effect on the cross head 39 when it is down but when it is moved up the spring 42a will strongly urge the lower arm of the lever 39a against the cross head 39 to hold it up with the pins 40 in the form. Thus the lever 39a and spring 42a will serve as a detent opposing movement of the pins 40 from their position extending into the form.

Opposite the pivots 46 and 49 there is secured to the lever 46 at 54 a pull rod 55 extending up through an arm 56 on the slide 15. A nut 57 is engaged with the rod 55 above the arm 56 to limit the upper movement of the arm 56 with respect to the rod 55. When the pins 40 are up and the parts 44, 47 and 51 in their positions shown dotted in FIG. 3, the arm 56 will engage beneath the nut 57 and will move the rod 55 upwardly to the solid line position. This will also move the levers 47 and 51, the arm 44 and the pins 40 to their solid line positions, thereby retracting the pins from the mold to a position below the table 7 so that the table 7 may be moved for ready removal and replacement of the filled form 8.

The dowel holes in the upper end of the conduit are provided by the dowel hole forming pins 58. These pins are carried on a cross head 59 suspended by suspension rods 60 from the slide 15. These rods pass through the slide and have nuts 61 on their upper ends limiting the upward movement of the slide 15 with respect thereto. These rods are secured to the cross head 59 by means of nuts 62. When the slide 15 is in its upper position the cross head 59 will be suspended as shown in FIG. 1 and the pins 58 will be held with their upper ends in or above the upper surface of the table 25 and above the upper end of the form 8. Thus all dowel hole formers are withdrawn before the form ends are removed and not afterward.

The cross head 59 is provided with laterally extending ears or extensions 63 adapted when the cross head is lowered to engage on top of the support elements 6 carried by the frame so as to suspend the cross head in its lower position as illustrated in FIG. 4. When in this position it will be seen that the pins 58 extend downwardly through the openings 28 in the table 25 and into the interior of the form 8 so as to provide dowel holes in a conduit formed in such form when the pins are thus in place. The rods 60, being slidable through the slide 15, merely stop moving downwardly when the projections 63 engage the support 6 to arrest movement of the cross head 59 and the pins 58, but the slide 15 is permitted to continue its downward movement thereafter.

In operation, the form is put in place while the various parts of the machine occupy the positions illustrated in FIG. 1 except that, of course, the form at this stage is empty but has the bottom plate 10 in place therein. The hydraulic cylinder mechanism comprising the cylinders 31 and the rods 32 is then operated to start the slide 15 downwardly. This downward movement carries the packer heads 19 downwardly through the interior of the form until they engage the openings in the bottom wall 10 and the support table 7 as illustrated in FIG. 4.

As the slide starts down the cross head 59 and the pins 58 start down with it until the extension 63 engage on top of the supports 6 and stop this downward movement. The point at which this downward movement stops is illustrated in FIG. 4 with the lower ends of pins 58 extending into the form 8 far enough to provide the necessary depth of dowel holes in the upper end of the form. Thereafter downward movement of the slide 15 does not change the position of the cross head 59 or the pins 58.

The initial downward movement of the slide 15 likewise produces downward movement of the loading table 25 until this table rests on top of the form 8, whereupon its downward movement is arrested. It is noted that this downward movement is arrested after only a short distance and that since the rods 24 are slidable in the slide 15, the slide 15 may continue its downward movement thereafter. The downward movement of the cross head 59 is not arrested by engagement of the parts 63 with the supports 6 until substantially later than the arrest of the downward movement of the table 25, so that the pins 58 coninue their downward movement until they project through the openings 28 and into the form 8.

During the same downward movement of the slide 15 the lower pins 40 remain in their lowermost position until this slide reaches a point near the lower end of its travel at which position the slide 15 engages the lever 51 and as the downward movement of the slide 15 continues the lever 51 is moved from a solid line position to its dotted line position, this latter position being reached just as the lowermost point of the travel of the slide 15 is attained. As hereinbefore described, this movement of the lever 51 causes the upward movement of the arm 44 and the pins 40 until these pins project into the form a sufficient distance to provide the dowel pin holes 43 in the lower end of a conduit formed in this form.

The packer heads are then rotated and the feeder mechanism 30 operated to feed cement mix into the hopper formed by the flange 29 and this mix is pushed in through the openings in the table 25 through which the packer heads moved on their downward movement. As this material falls on and around the packer heads it is packed in place as shown in the lower portion of FIG. 4 and as soon as the lower end of the form becomes fully packed with cement mix, the slide 15 is started on a relatively slow upward movement while rotation of the packer heads 19 continues and the feeding of the cement mix into the form also continues. During this upward movement the pins 40 remain in their position projecting into the lower end of the form and the pins 58 remain in their position projecting into the upper end of the form until the point is reached at which the arm 56 engages the nut 57 and the upper surface of the slide 15 engages the nuts 61. It is noted that this will occur before the table 25 which forms the top of the mold 8 is lifted off the top of the mold. Thereupon further upward movement of the slide 15 acts through the rods 55, the lever 47, the rods 45 and the arm 44 to lower the pins 40 to a position with their upper ends below the table 7.

Thus it will be seen that the pins 40 and 58 will be extracted from the conduit formed in the mold in the form 8 while the end walls of this form are still in position thereby preventing any breaking away of any portion of the unset concrete in the mold by the removal of these pins. It will also be seen by observing FIG. 1 that the pins will be removed substantially as the slinger portions at the upper ends of the packer heads emerge from the upper end of the form 8 so that the holes formed by the pins 58 will not be closed by action of the slingers after the removal of the pins 58 and the only action upon the interior of the ducts through the conduit after the removal of the pins 58 will be the action of the troweling sections 19 which do not tend to further pack the cement mix but merely to smooth the walls of the ducts in the conduit. After complete removal of the packer heads 19 has taken place the suspension rods 24 will come into play due to the engagement of the upper surface of the slide 15 with the nuts 26, and thereupon the table 25 which forms the upper end of the mold will be removed from the upper end of the mold. The parts will then be in position so that the support table 7 may be rotated on its pivot 9 to a point where the mold 8 is readily accessible for removal from the machine and another mold may be put in place and the process repeated.

It will be seen from the foregoing that a means has been provided whereby dowel pin holes may be formed in the opposite ends of a conduit in the course of forming the conduit, that the pins that form such holes may then be removed without any possibility of damage to the conduit thus formed and without any arduous labor or care necessary in the process.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

The invention having been described, what is claimed is:

1. In a conduit forming machine of the type having a frame, a form support thereon, a form on said support having ends with aligned openings therein in positions registering with the ends of a duct to be formed in a conduit in said form, a packer head, a packer head supporting and driving shaft carrying said head, and means on the frame and endwise from said form for rotatably and longitudinally slidably mounting said shaft on said frame in axial alignment with said openings in one endwise direction from said form, said slidable mounting means providing limits for sliding movement of said shaft great enough to permit movement of said head through said form from one end to the other and out of said form through the opening in one end of said form, and driving means including means for rotating said shaft and head and means for simultaneously sliding said shaft to move said head longitudinally through and out of said form, the improvement which comprises opposed dowel hole forming pins, guide means on the frame spaced from and opposed to the opposite ends of said form and slidably supporting said pins with their axes parallel to the axis of said shaft for axial sliding movement into and from said form through the opposite ends thereof respectively between positions extending into said form through said respective ends and positions outside and clear of said form, means interconnecting said opposed pins for moving one in one axial direction upon movement of the other in the opposite direction, and a lost motion control means interconnecting one of said pins and said shaft for moving said pins to their positions extending into said form upon movement of said shaft passing said head through said form to the end thereof opposite the mounting of said shaft, and for moving said pins to their positions outside and clear of said form upon movement of said shaft withdrawing said head from said form.

2. A conduit forming machine in accordance with claim 1 having in combination therewith a yieldable detent interengaging said frame and pins and opposing movement of said pins from their position extending into said form.

References Cited in the file of this patent
UNITED STATES PATENTS

| | | |
|---|---|---|
| 1,428,044 | Martin | Sept. 5, 1922 |
| 1,937,350 | La Due | Nov. 28, 1933 |
| 2,530,687 | Dixon | Nov. 21, 1950 |
| 2,875,499 | Ross | Mar. 3, 1959 |

FOREIGN PATENTS

| | | |
|---|---|---|
| 2,085/26 | Australia | Mar. 18, 1927 |